United States Patent
Akazawa et al.

(10) Patent No.: US 7,243,114 B2
(45) Date of Patent: Jul. 10, 2007

(54) ELECTRONIC DOCUMENT SYSTEM, ELECTRONIC DOCUMENT MANAGEMENT APPARATUS, COMPUTER PROGRAM PRODUCT, AND COMPUTER MEMORY PRODUCT

(75) Inventors: Masashi Akazawa, Tokushima (JP); Masanao Fukuichi, Tokushima (JP); Akinobu Miyamoto, Tokushima (JP); Akiko Gondo, Tokushima (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 10/298,901

(22) Filed: Nov. 19, 2002

(65) Prior Publication Data

US 2004/0003010 A1 Jan. 1, 2004

(30) Foreign Application Priority Data

Jun. 27, 2002 (JP) ............................. 2002-188566

(51) Int. Cl.
*G06F 17/30* (2006.01)
*G06F 17/00* (2006.01)

(52) U.S. Cl. ....................................... 707/203; 707/102

(58) Field of Classification Search .............. 707/1–10, 707/100–104.1, 203
See application file for complete search history.

(56) References Cited

U.S. PATENT DOCUMENTS 5,553,216 A * 9/1996 Yoshioka et al. ........... 715/515
6,301,592 B1 * 10/2001 Aoyama et al. ............. 715/511
2003/0046351 A1 * 3/2003 Maruyama et al. ......... 709/206

FOREIGN PATENT DOCUMENTS

| JP | 7-334574 | 12/1995 |
| JP | 10-187859 | 7/1998 |
| JP | 10-320463 | 12/1998 |
| JP | 2001-51982 | 2/2001 |

OTHER PUBLICATIONS

Office Action mailed May 16, 2006 in Japanese Application No. 2002-188566.

* cited by examiner

*Primary Examiner*—Joon Hwan Hwang
(74) *Attorney, Agent, or Firm*—Staas & Halsey LLP

(57) ABSTRACT

A management apparatus searches whether or not a notification file corresponding to a document name displayed on a display is present within a difference management table, and displays a predetermined indication "*", which indicates the presence of a notification file, on the display, when a notification file is present. When conventional documents are converted into electronic documents, there arises problems that rather inconveniences would be brought compared to the paper-printed documents before converted into the electronic documents, and these inconveniences may cause mistakes in the work and misjudgments in the maintenance and operation of machinery and equipment and may induce considerable economical loss in the business activities and serious accidents in the maintenance and operation of machinery and equipment. However, these problems are solved by the present invention.

24 Claims, 15 Drawing Sheets

FIG. 2

21 (ORIGINAL FILE SYSTEM)

| FILE NAME | CONTENT |
|---|---|
| PURCHASE 0000 | Purchasing procedure is as follows···· |
| PURCHASE 0001 | At purchasing··· |
| PURCHASE 0002 | Goods requiring purchasing··· |
| PURCHASE 0003 | At ordering···· |
| ORDER ACCEPTING 0000 | Order accepting procedure is as follows ···· |
| ORDER ACCEPTING 0001 | At order accepting···· |
| ORDER ACCEPTING 0002 | When order is accepted···· |

FIG. 3

22 (NOTIFICATION FILE SYSTEM)

| FILE NAME | CONTENT | DETAILED CONTENT | NOTIFICATION DATE |
|---|---|---|---|
| NOTIFICATION 0005 | The format of the estimate will be changed. | — | — |
| NOTIFICATION 0004 | The payment method will be changed. | — | — |
| NOTIFICATION 0003 | Designated account will be changed. | — | — |

FIG. 4

23 (ORIGINAL MANAGEMENT TABLE)

| DOCUMENT No. | DOCUMENT NAME | FILE NAME |
|---|---|---|
| F001 | Purchase Procedure | PURCHASE 0000 |
| D001 | First Chapter-General Rules | PURCHASE 0001 |
| D002 | Second Chapter-General Procedure | PURCHASE 0002 |
| F002 | Order Accepting Procedure | ORDER ACCEPTING 0000 |
| D012 | First Chapter-General Rules | ORDER ACCEPTING 0001 |
| D013 | Second Chapter-General | ORDER ACCEPTING 0002 |

FIG. 5

24 (NOTIFICATION MANAGEMENT TABLE)

| NOTIFICATION No. | NOTIFICATION NAME | FILE NAME |
|---|---|---|
| T001 | Change in Purchase Rules (Feb.) | NOTIFICATION 0003 |
| T002 | Change in Purchase Rules (Apr.) | NOTIFICATION 0004 |
| T003 | Change in Purchase Rules (May) | NOTIFICATION 0005 |

FIG. 6

25 (DIFFERENCE MANAGEMENT TABLE)

| NOTIFICATION No. | DOCUMENT No. | REFLECTED STATUS |
|---|---|---|
| T003 | D001 | NOT REFLECTED |
| T002 | D002 | NOT REFLECTED |
| T001 | D002 | REFLECTED |
| | | |

FIG. 9A

- Purchase Procedure
  - First Chapter-General Rules *
  - Second Chapter-General Procedure *
- Order Accepting Procedure
  - First Chapter-General Rules *
  - Second Chapter-General *

Relevant Notification
(not reflected to Original)
  · Change in Purchase Rules (Apr.)

FIG. 9C

- CONTENT
   The payment method will be changed.
- DETAILS

FIG. 14

P1: ACCESS ORIGINAL FILE SYSTEM 21, NOTIFICATION FILE SYSTEM 22, ORIGINAL MANAGEMENT TABLE, AND DIFFERENCE MANAGEMENT TABLE 25

P2: ACCEPT INSTRUCTION TO DISPLAY DOCUMENT NAMES OF ORIGINAL FILES STORED IN ORIGINAL FILE SYSTEM 21 ON DISPLAY

P3: READ OUT DOCUMENT NAMES OF ORIGINAL FILES FROM ORIGINAL MANAGEMENT TABLE 23 AND DISPLAY DOCUMENT NAMES ON DISPLAY ACCORDING TO ACCEPTED INSTRUCTION

P4: SEARCH WHETHER OR NOT DOCUMENT NUMBERS SPECIFYING DOCUMENT NAMES OF ORIGINAL FILES DISPLAYED ON DISPLAY ARE STORED IN DIFFERENCE MANAGEMENT TABLE 25

P5: CONTROL DISPLAY TO DISPLAY PREDETERMINED INDICATION "*" INDICATING PRESENCE OF NOTIFICATION FILE, IF IT IS FOUND THAT DOCUMENT NUMBERS BEING SEARCHED FOR ARE STORED IN DIFFERENCE MANAGEMENT TABLE 25

FIG. 15

P11: ACCESS NOTIFICATION MANAGEMENT TABLE 24 STORING NOTIFICATION NUMBERS SPECIFYING NOTIFICATION FILES STORED IN NOTIFICATION FILE SYSTEM 22 AND NOTIFICATION NAMES OF RESPECTIVE NOTIFICATION FILES IN CONNECTION WITH EACH OTHER

P12: ACCEPT DESIGNATION OF PREDETERMINED INDICATION"*"

P13: READ OUT NOTIFICATION NUMBER SPECIFYING NOTIFICATION FILE CORRESPONDING TO ACCEPTED DESIGNATED PREDETERMINED INDICATION"*" FROM DIFFERENCE MANAGEMENT TABLE 25

P14: READ OUT NAME OF NOTIFICATION FILE SPECIFIED BY READ NOTIFICATION NUMBER, FROM NOTIFICATION MANAGEMENT TABLE 24, AND DISPLAY IT ON DISPLAY

P21: DISPLAY DOCUMENT NAMES OF DOCUMENT FILES STORED IN ORIGINAL MANAGEMENT TABLE 23

P22: ACCEPT DESIGNATION OF DOCUMENT NAME OF ORIGINAL FILE DISPLAYED ON DISPLAY

P23: READ OUT DOCUMENT NUMBER SPECIFYING ORIGINAL FILE CORRESPONDING TO ACCEPTED DOCUMENT NAME, FROM ORIGINAL MANAGEMENT TABLE 23

P24: READ OUT ORIGINAL FILE CORRESPONDING TO READ DOCUMENT NUMBER, FROM ORIGINAL FILE SYSTEM 21, AND DISPLAY ORIGINAL FILE ON DISPLAY

ELECTRONIC DOCUMENT SYSTEM, ELECTRONIC DOCUMENT MANAGEMENT APPARATUS, COMPUTER PROGRAM PRODUCT, AND COMPUTER MEMORY PRODUCT

BACKGROUND OF THE INVENTION

1. Field of the Invention

The present invention relates to an electronic document system, and more particularly relates to an electronic document system that allows easy management when the content thereof is changed, revised, etc. More specifically, it is a principal object of the present invention to provide an electronic document system and an electronic document management apparatus, capable of allowing easy understanding of the status of an electronic document when some change was made to the content of the original of the electronic document, allowing smooth use of the electronic document, and preventing errors in the use of the electronic document.

2. Description of Related Art

In recent years, electronization of a variety of documents has been promoted. For example, by converting documents, such as the office manuals of enterprises, particularly financial institutions, the maintenance and operation manuals of various machinery and equipment (ships, aircrafts, power stations, industrial complexes, etc.), specifications (drawings), the codes and clerical procedures of government offices, the school regulations of various schools, the regulations of ISO, JAS, etc., or the manuals of home appliances, into electronic documents, it becomes possible to smoothly carry out daily work and deal with a variety of problems, if happen, by promptly finding the corresponding rules and regulations to be referenced.

By the way, while the conversion of documents into electronic documents has been promoted in the above-mentioned fields, this involves new problems. Such a variety of documents are subject to change relatively often depending on cases such as revisions of laws, acts or the like, changes in a system, or the case where there is an inappropriateness or mistake in the content of the conventional statement.

In the case where a conventional manual printed on paper (original document) which is not converted into an electronic document is possessed and being used, if the content of the original document is changed, the content of the change, the effective date, etc. are generally notified by a notification document until the original document will have been actually revised and the change will have been reflected in the original document. In this case, until the change of the content notified by the notification document is actually reflected in the original document (until the original document itself is revised according to the content of the notification document), it generally takes considerable time lag due to printing and distribution of the corresponding portion of the original document and the replacement of the corresponding portion in the actual field. Therefore, in the actual field, both of the unrevised original document and the notification document showing the revised content are present for a certain period. In such a period, in the actual field received the notification document, by temporarily attaching a tag, for example, to the corresponding portion of the original document, it is possible to easily know that a notification document, which indicates that some change was made to the portion of the original document, has already been issued, and also know the content of the change itself.

However, if the original document is converted into an electronic document, the electronic original document and the electronic notification document are both present, and therefore, when the electronic original document is displayed on the display of a terminal device, it is impossible to immediately judge whether or not a notification document, which indicates that a change was made to a portion of the document, has been issued and thus it is necessary to examine the electronic notification document separately. On the other hand, when the electronic notification document is displayed on the display of the terminal device, it is impossible to immediately judge whether or not the change has already been reflected in the original document (the electronic original document has been revised according to the content of the notification document), and thus it is necessary to examine the electronic original document separately.

Hence, when various documents are converted into electronic documents, rather inconveniences would arise compared to paper-printed documents before converted into electronic documents, and these inconveniences may bring big problems of causing mistakes in the work, misjudgments in the maintenance and operation of machinery and equipment, and inducing considerable economical loss in the business activities and serious accidents in the maintenance and operation of machinery and equipment.

BRIEF SUMMARY OF THE INVENTION

The present invention has been made with the aim of solving the above problems, and it is an object of the present invention to provide an electronic document system and an electronic document management apparatus, which, when an electronic original document and an electronic notification document showing a change in the content of the original document are both present, and when the electronic original document is displayed on the display of a terminal device, enables accurate recognition of whether or not a notification document has already been issued to a portion of the electronic original document, while, when an electronic notification document is displayed on the display of the terminal device, enables accurate recognition of whether or not the notification has already been reflected in the original document, and thereby preventing mistakes in the work and misjudgments in the maintenance and operation of machinery and equipment and avoiding considerable economical loss in the business activities and serious accidents in the maintenance and operation of machinery and equipment, and to also provide a computer program product and a computer memory product for realizing the electronic document system and the electronic document management apparatus by a general-purpose computer system.

An electronic document system of the present invention is characterized by comprising: an original file system for storing unit original electronic information created by dividing an original document into a plurality of units and converting into electronic information; a notification file system for storing notification electronic information created by converting a notification document, which notifies that a change was made to the original document, into electronic information; an original management table for storing information specifying the unit original electronic information stored in the original file system and information suggesting a content of each unit original electronic information in connection with each other; a difference management table for storing information specifying unit original electronic information corresponding to a portion of the original document to which the change was made and information specifying the corresponding notification electronic information to correspond with each other; a display unit for displaying information; and a management apparatus includes a processor capable of performing operations of: displaying on the display unit the information suggesting the content of unit original electronic information stored in the original management table; searching whether or not information specifying the unit original electronic information corresponding to the information displayed on the display unit is stored in the difference management table; and displaying a predetermined indication, which indicates presence of notification electronic information, on the display unit when it is found in the searching operation that the information being searched for is stored in the difference management table.

In such an electronic document system of the present invention, the display unit displays the information (for example, the name or a portion of unit original information) suggesting the content of the unit original electronic information stored in the original management table, a search is performed to find whether or not the information specifying the unit original information corresponding to the information displayed on the display unit is stored in the difference management table, and, when it is found that the information being searched for is stored in the difference management table, a predetermined indication, which indicates presence of notification electronic information, is displayed on the display unit.

Moreover, the electronic document system of the present invention is based on the above-described invention, and characterized by further comprising a notification management table for storing information specifying the notification electronic information stored in the notification file system and information suggesting a content of each notification electronic information in connection with each other, wherein the processor of the management apparatus further capable of performing operations of: when the predetermined indication displayed on the display unit is designated, reading out the information specifying the notification electronic information corresponding to the designated predetermined indication from the difference management table; reading out the information suggesting the content of the notification electronic information specified by the read information from the notification management table; and displaying the information read out from the notification management table on the display unit.

In such an electronic document system of the present invention, when the predetermined indication displayed on the display unit is designated, the information specifying the notification electronic information corresponding to the designated predetermined indication is read out from the difference management table, and the information (for example, the name or a portion of the notification electronic information) suggesting the content of the notification electronic information specified by the read information is read out and displayed on the display unit.

Furthermore, the electronic document system of the present invention is based on each invention as described above, and characterized in that the processor of the management apparatus further capable of performing operations of: displaying on the display unit the information suggesting the content of the unit original electronic information stored in the original management table; when the information suggesting the content of the unit original electronic information displayed on the display unit is designated, reading out the information specifying the unit original electronic information corresponding to the designated information from the original management table; reading out the unit original electronic information corresponding to the read information from the original file system; and displaying the information read out from the original file system on the display unit.

In such an electronic document system of the present invention, the display unit displays the information (for example, the name or a portion of unit original electronic information) suggesting the content of the unit original electronic information stored in the original management table, and, when the information displayed on the display unit is designated, the information specifying the unit original electronic information corresponding to the designated information is read out from the original management table, and the unit original electronic information corresponding to the read information is read out from the original file system, and displayed on the display unit.

Besides, an electronic document management apparatus of the present invention is characterized by comprising a processor capable of performing operations of: accessing an original file system for storing unit original electronic information created by dividing an original document into a plurality of units and converting into electronic information; a notification file system for storing notification electronic information created by converting a notification document, which notifies that a change was made to the original document, into electronic information; an original management table for storing information specifying the unit original electronic information stored in the original file system and information suggesting a content of each unit original electronic information in connection with each other; and a difference management table for storing information specifying unit original electronic information corresponding to a portion of the original document to which the change was made and information specifying the corresponding notification electronic information to correspond with each other; accepting an instruction to display on a display unit the information suggesting the content of the unit original electronic information stored in the original management table; reading out the information suggesting the content of the unit original electronic information from the original management table and displaying the information on the display unit according to the accepted instruction; searching whether or not information specifying the unit original electronic information corresponding to the information displayed on the display unit is stored in the difference management table; and displaying a predetermined indication, which indicates presence of notification electronic information, on the display unit when it is found in the searching operation that the information being searched for is stored in the difference management table.

In such an electronic document management apparatus of the present invention, an instruction to display on the display unit the information (for example, the name or a portion of unit original information) suggesting the content of the unit original electronic information stored in the original management table is accepted, the information suggesting the content of the unit original electronic information is read out from the original management table and displayed on the display unit according to the accepted instruction, search whether or not the information specifying the unit original electronic information corresponding to the information displayed on the display unit is stored in the difference management table is executed, and, when it is finds as a result of the search that the information being searched for is stored in the difference management table, a predetermined indication which indicates the presence of notification electronic information is displayed on the display unit.

Moreover, the electronic document management apparatus of the present invention is based on the above-described invention, and characterized in that the processor further capable of performing operations of: accessing a notification management table for storing information specifying the notification electronic information stored in the notification file system and information suggesting a content of each notification electronic information in connection with each other; when the predetermined indication displayed on the display unit is designated, reading out the information specifying the notification electronic information corresponding to the designated predetermined indication from the difference management table; reading out the information suggesting the content of the notification electronic information specified by the read information from the notification management table; and displaying the information read out from the notification management table on the display unit.

In such an electronic document management apparatus of the present invention, when the predetermined indication displayed on the display unit is designated, the information specifying the notification electronic information corresponding to the designated predetermined indication is read out from the difference management table, and the information (for example, the name or a portion of the notification electronic information) suggesting the content of the notification electronic information specified by the read information is read out from the notification management table, and displayed on the display unit.

Furthermore, the electronic document management apparatus of the present invention is based on each invention as described above, and characterized in that the processor further capable of performing operations of: displaying the information suggesting the content of the unit original electronic information stored in the original management table on the display unit; when the information suggesting the content of the unit original electronic information displayed on the display unit is designated, reading out the information specifying the unit original electronic information corresponding to the designated information from the original management table; reading out the unit original electronic information corresponding to the read information from the original file system; and displaying the information read out from the original file system on the display unit.

In such an electronic document management apparatus of the present invention, the information suggesting the content of the unit original electronic information stored in the original management table is displayed on the display unit, and, when the information displayed on the display unit is designated, the information specifying the unit original electronic information corresponding to the designated information is read out from the original management table, and the unit original electronic information corresponding to the read information is read out from the original file system, and displayed on the display unit.

Besides, a computer program product for use with an electronic document system of the present invention is characterized by comprising: a computer usable storage medium having a computer readable program code embodied therein for managing an electronic document system, the computer readable program code comprising: causing a computer to access an original file system for storing unit original electronic information created by dividing an original document into a plurality of units and converting into electronic information; a notification file system for storing notification electronic information created by converting a notification document, which notifies that a change was made to the original document, into electronic information; an original management table for storing information specifying the unit original electronic information stored in the original file system and information suggesting a content of each unit original electronic information in connection with each other; and a difference management table for storing information specifying unit original electronic information corresponding to a portion of the original document to which the change was made and information specifying the corresponding notification electronic information to correspond with each other; causing a computer to accept an instruction to display on a display unit the information suggesting the content of the unit original electronic information stored in the original management table; causing a computer to read out the information suggesting the content of the unit original electronic information from the original management table and display the information on the display unit according to the accepted instruction; causing a computer to search whether or not the information specifying the unit original electronic information corresponding to the information displayed on the display unit is stored in the difference management table; and causing a computer to display a predetermined indication, which indicates presence of notification electronic information, on the display unit when it is found that the information being searched for is stored in the difference management table.

Moreover, the computer program product of the present invention is based on the above-described invention, and characterized in that the computer readable program code further comprises: causing a computer to access notification management table storing means for storing information specifying the notification electronic information stored in the notification file storing means and information suggesting a content of each notification electronic information in connection with each other; causing a computer to accept designation of the predetermined indication; causing a computer to read out the information specifying the notification electronic information corresponding to the accepted designated predetermined indication, from the difference management table storing means; and causing a computer to read out information suggesting the content of the notification electronic information specified by the read information, from the notification management table storing means, and display the information on the displaying means.

Furthermore, the computer program product of the present invention is based on each invention as described above, and characterized in that the computer readable program code further comprises: causing a computer to display on the display unit the information suggesting the content of the unit original electronic information stored in the original management table; causing a computer to accept designation of the information suggesting the content of the unit original electronic information displayed on the display unit; causing a computer to read out the information specifying the unit original electronic information corresponding to the accepted designated information, from the original management table; and causing a computer to read out the unit original electronic information corresponding to the read information, from the original file system, and display the information on the display unit.

With such a computer program product of the present invention, it is possible to realize the above-described electronic document management apparatus of the present invention by installing the computer program product in a general-purpose computer system.

In addition, a computer memory product readable by a computer to manage an electronic document system of the present invention is characterized by that the computer being capable of accessing an original file system for storing unit original electronic information created by dividing an original document into a plurality of units and converting into electronic information; a notification file system for storing notification electronic information created by converting a notification document, which notifies that a change was made to the original document, into electronic information; an original management table for storing information specifying the unit original electronic information stored in the original file system and information suggesting a content of each unit original electronic information in connection with each other; and a difference management table for storing information specifying unit original electronic information corresponding to a portion of the original document to which the change was made and information specifying the corresponding notification electronic information to correspond with each other; the computer memory product comprising: accepting an instruction to display on a display unit the information suggesting the content of the unit original electronic information stored in the original management table; reading out the information suggesting the content of the unit original electronic information from the original management table and displaying the read information on the display unit according to the accepted instruction; searching whether or not the information specifying the unit original electronic information corresponding to the information displayed on the display unit is stored in the difference management table; and displaying a predetermined indication, which indicates presence of notification electronic information, on the display unit when it is found that the information being searched for is stored in the difference management table.

Moreover, the computer memory product of the present invention is based on the above-described invention, and characterized in that the computer is capable of further accessing a notification management table for storing information specifying the notification electronic information stored in the notification file system and information suggesting a content of each notification electronic information in connection with each other, the computer memory product further comprising: accepting designation of the predetermined indication; reading out the information specifying the notification electronic information corresponding to the accepted designated predetermined indication, from the difference management table; and reading out information suggesting the content of the notification electronic information specified by the read information, from the notification management table, and displaying the information on the display unit.

Furthermore, the computer memory product of the present invention is based on each invention as described above, and characterized by further comprising: displaying on the display unit the information suggesting the content of the unit original electronic information stored in the original management table; accepting designation of the information suggesting the content of the unit original electronic information displayed on the display unit; reading out the information specifying the unit original electronic information corresponding to the accepted designated information, from the original management table; and reading out the unit original electronic information corresponding to the read information, from the original file system, and displaying the information on the display unit.

With such a memory product of the present invention, it is possible to realize the above-described electronic document management apparatus by installing the stored computer program in a general-purpose computer system.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic view showing the content of an original file system of the electronic document system of the present invention;

FIG. 3 is a schematic view showing the content of a notification file system of the electronic document system of the present invention;

FIG. 4 is a schematic view showing the content of an original management table of the electronic document system of the present invention;

FIG. 5 is a schematic view showing the content of a notification management table of the electronic document system of the present invention;

FIG. 6 is a schematic view showing the content of a difference management table of the electronic document system of the present invention;

FIG. 9A, FIG. 9B and FIG. 9C are schematic views of the displayed screen of the display of an operated terminal device when the system is operated from any one of the terminal devices of the electronic document system of the present invention;

FIG. 14 is a schematic view showing the content of a memory product of the present invention; and FIG. 15 is a schematic view showing the content of a memory product of the present invention.

DETAILED DESCRIPTION OF THE PREFERRED EMBODIMENTS

The following description will explain in detail the present invention with reference to the drawings illustrating some embodiments thereof. In the following embodiment, as information suggesting the content of unit original electronic information, i.e., electronic files created by dividing an original document into a plurality of units and converting them into electronic form, registered in an original file system 21, the names of the files (file names) are used, while, as information suggesting the content of notification electronic information, i.e., notification files, registered in a notification file system 22, the names of the notification files (file names) are used. However, needless to say, it is possible to use a part of the content of each file, for example, top several letters, instead of the file name.

Figure 1:
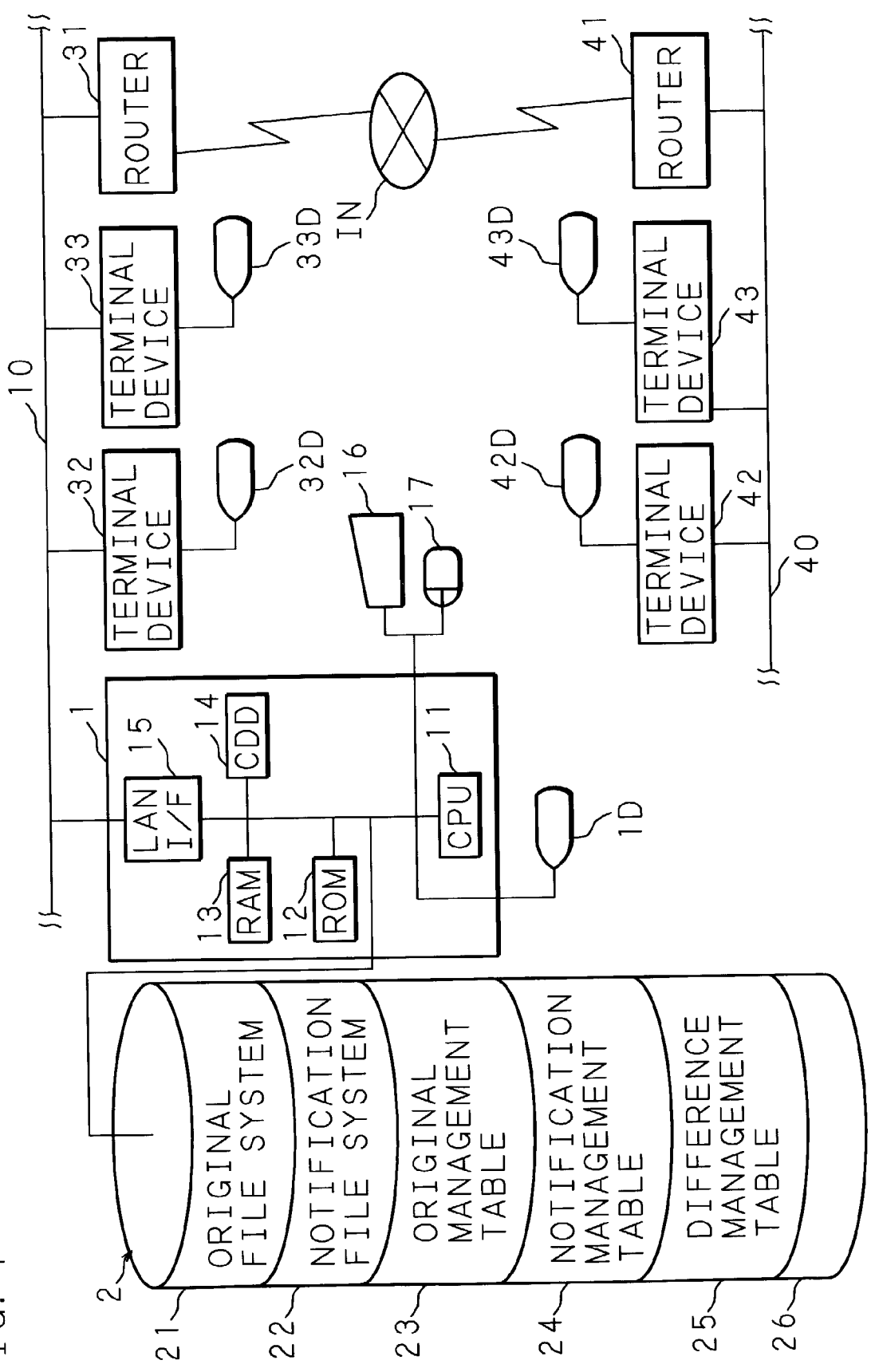
FIG. 1 is a block diagram showing an example of the entire structure of an electronic document system of the present invention.

FIG. 1 is a block diagram showing an example of the entire structure of an electronic document system according to the present invention, wherein 1 denotes a management apparatus and 2 denotes the film system. For the management apparatus 1, it is possible to use an ordinary general-purpose computer system, and the management apparatus 1 includes a display 1D and input/output interface such as a keyboard 16, a mouse 17, etc. Moreover, the management apparatus 1 is provided with the file system 2 and constructed as a database. Note that this file system 2 is stored in a memory device such as a hard disk to which only the management apparatus 1 can access directly.

Stored in the file system 2 are files, such as the original file system 21 in which files created by dividing the content of the original of an electronic document into a plurality of units and converting them into electronic data (hereinafter referred to as the "original files") are registered, a notification file system 22 in which a file created by converting the content of a notification document which is issued when some change is made to the content registered in the original file system 21, i.e., the original, into electronic data (hereinafter referred to as the "notification file") is registered, an original management table 23 in which information for managing the original file system 21 is registered in table form, a notification management table 24 in which information for managing the notification file is registered in table form, and a difference management table 25 in which information for managing the original files and the notification files to correspond with each other is registered in table form. Besides, in this file system 2, various kinds of programs, data, etc. necessary for the control of the management apparatus 1 are stored in a remaining portion 26 in advance.

As described above, the management apparatus 1 is an ordinary general-purpose computer system, and comprises a CPU 11 as the control center for managing the entire control, a ROM 12, a RAM 13, a CD-ROM drive (CDD) 14 capable of loading electronic information such as data and a computer program recorded on, for example, a CD-ROM as a memory product, a LAN interface (I/F) 15 for connecting to a communication line 10 such as a LAN, for example, etc.

The management apparatus 1 is connected to some terminal devices 32, 33, . . . and a router 31 through the communication line 10 such as a LAN as described above. All of the terminal devices 32, 33 . . . are ordinary general-purpose computer systems capable of using WEB browsers, and include displays 32D, 33D, . . . and input/output interfaces such as keyboards, mice (not shown), etc. Further, the router 31 connects the communication line 10 to a computer communication network such as the Internet IN.

42, 43 . . . denote terminal devices connectable to the management apparatus 1 through the Internet IN, and are connected to a communication line 40 such as a LAN to which a router 41 connected to the Internet IN is connected. All of the terminal devices 42, 43 . . . are ordinary general-purpose computer systems capable of using WEB browsers, and include displays 42D, 43D, . . . and input/output interfaces such as keyboards, mice (not shown), etc.

Needless to say, while the above-mentioned terminal devices 32, 33, . . . , 42, 43 . . . are also general-purpose computer systems having basically the same structures as the above-described management apparatus 1, it is possible to construct them as computer systems specialized for the system of the present invention.

FIG. 2 is a schematic view showing the content of the original file system 21. In this original file system 21, a plurality of original files provided with file names, respectively, are registered, and, for example, the content of an original file with the file name "PURCHASE 0001" is "At purchasing . . . ". The content of each original file registered in the original file system 21 is a file created by converting a predetermined unit of the content of the original document (a document unit corresponding to each heading in the table of contents to be described later) into electronic data.

FIG. 3 is a schematic view showing the content of the notification file system 22. In this notification file system 22, a plurality of notification files provided with file names, respectively, are registered, and, for example, the content of a notification file with the file name "NOTIFICATION 0005" is "The format of the estimate will be changed", and further the notification dates when the notification documents were issued are registered. The content of a notification file registered in the notification file system 22 is a file created by converting a notification document, which is issued when some change is made to the original, into electronic data. Note that the actual content notified by the notification document (notification file) is registered in the detailed content portion. For instance, in the above-mentioned example, the format of the "estimate" after changed is registered in the detailed content portion.

FIG. 4 is a schematic view showing the content of an original management table 23. This original management table 23 is a table for managing the file name of each document file registered in the original file system 21, the document name and the document number (No) thereof in connection with each other. In this embodiment, the document names are the headings in the table of contents, corresponding to the respective original files registered in the original file system 21, and the document number is unique identification information for specifying each original file registered in the original file system 21. For instance, it can be understood that the document number "D001" corresponds to the document name "First Chapter—General Rules", and the actual content is registered in the file name "PURCHASE 0001" in the original file system 21. In this case, since there is a possibility of the presence of documents having the same name in the entire original documents, it is necessary to add a document number as unique identification information. In an example shown in FIG. 4, since "First Chapter—General Rules" are present as the document name in both of "Purchase Procedure" and "Order Accepting Procedure", it is necessary to add unique document numbers for distinguishing them from each other.

Note that, the document names registered in the original management table 23 are the items in the table of contents of the original document, and the table of contents of the document registered in the original file system 21 can be displayed by displaying only these document names.

FIG. 5 is a schematic view showing the content of a notification management table 24. This notification management table 24 is a table for managing the file name of each file registered in the notification file system 22 (in which the content and the detailed content of each notification file are registered), the notification name and the notification number (No) thereof in connection with each other. Here, the notification number is unique identification information for specifying each notification file registered in the notification file system 22. For instance, it can be understood that the notification number "T0002" corresponds to the notification name "Change in Purchase Rules (April)", and the actual content is registered in the file name "NOTIFICATION 0004" in the notification file system 22. In this case, since there is a possibility of the presence of notification files having the same notification name, it is necessary to add notification numbers as unique identification information.

FIG. 6 is a schematic view showing the content of a difference management table 25. This difference management table 25 is a table for managing the notification numbers registered in the notification management table 24, a document number (registered in the original management table 23) corresponding to a notification file specified by each notification number, and the reflected status that is information showing whether or not a change in the document indicated by the notification file of each notification number has been reflected in the content registered in the original file system (showing "reflected" when the change has been reflected, or "not reflected" when the change has not been reflected) in connection with each other. For instance, it can be understood that a notification file with the notification number "T0002" has the document number "D002" and the reflected status is "not reflected".

In the file system 2 of the management apparatus 1, the file systems 21, 22 and tables 23, 24, 25 as described above are registered in advance, and it is possible to control, i.e., update, delete, etc., the content of the file system 2 by operating a display 1D and the input/output interface provided for the management apparatus 1.

Figure 7:
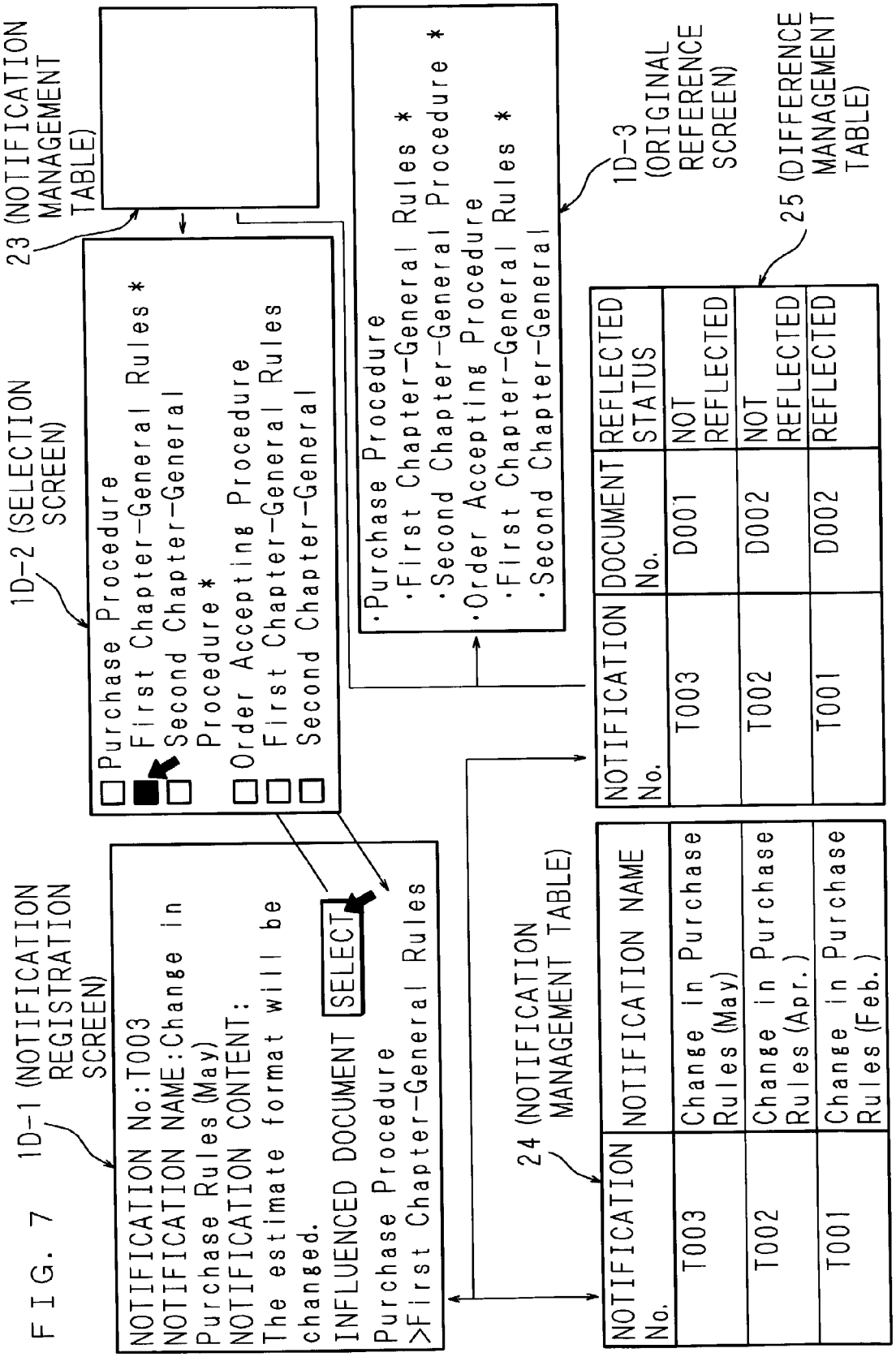
FIG. 7 is a schematic view showing the relationship between the displayed screen of a display and relevant tables when registering a notification document in a management apparatus of the electronic document system of the present invention.
Figure 8:
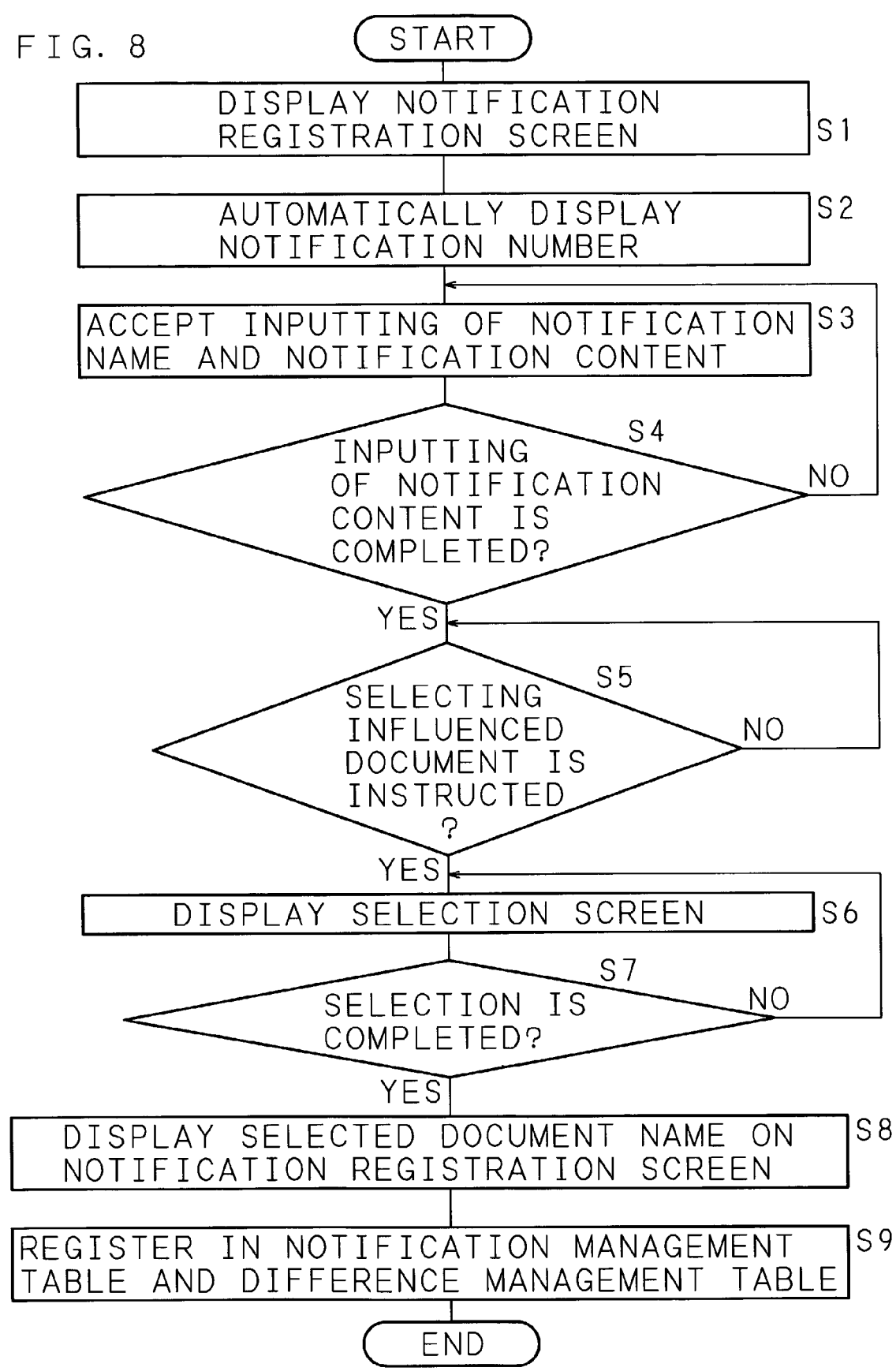
FIG. 8 is a flow chart showing the procedure of registering a notification document in the management apparatus of the electronic document system of the present invention.

FIG. 7 is a schematic view showing the relationship between the displayed screen of the display 1D and relevant tables when registering a notification document as a notification file in the management apparatus 1. Besides, FIG. 8 is a flow chart showing the procedure of registering a notification file in the management apparatus 1. Referring to these figures, the following description will explain the procedure of registering a notification file in the management apparatus 1.

When an operator instructs the registration of a notification file by operating a keyboard 16, mouse 17, etc. of the management apparatus 1, the CPU 11 displays a notification registration screen 1D-1 on the display 1D as shown in FIG. 7 (step S1). At this time, the CPU 11 accesses the notification management table 24, creates a new notification number ("T003" in this example) by auto increment, and displays it on the notification registration screen 1D-1 (step S2).

Next, the CPU 11 accepts the notification name and notification content inputted by operating the keyboard 16, etc. by the operator (step S3), and displays them on the notification registration screen 1D-1 when the inputting is completed ("YES" in step S4). In this example, "Change in Purchase Rules (May)" and "The format of the estimate will be changed." are inputted as the notification name and the notification content, respectively.

In this state, when the operator instructs to select an influenced document (document which is influenced by a notification file registered at this time) (YES in step S5), the CPU 11 accesses the original management table 23 to read the document name, and displays a selection screen (1D-2) arranged as a table of contents (step S6). When the operator selects a document name influenced by the notification file registered at this time and specifies it by clicking the mouse 17, for example (step S7), the CPU 11 displays the selected document name on the notification registration screen 1D-1 (step S8). In this example, the subheading "First Chapter—General Rules" in the main heading "Purchase Procedure" is selected. It can be understood from the original management table 23 that the document number of this document is "D003".

Thus, the CPU 11 registers the notification name "Change in Purchase Rules (May)" in the notification management table 24 so as to correspond with the notification number "T003" at this time, and registers this notification number "T003", the document number "D003" to be influenced, and the reflected status "not reflected" in the difference management table 25 (step S9).

Although the detail will be described later, when an original reference screen 1D-3 is displayed on any one display as shown in the FIG. 7, the CPU 11 accesses the difference management table 25 and displays a predetermined mark "*" at the end of the document of a document number whose reflected status is "not reflected".

Note that a change in the original document notified by the notification file can be registered in the original file system 21 by inputting the change itself through a special screen provided separately, or converting it into electronic data by reading the printed document with a scanner.

Figure 10:
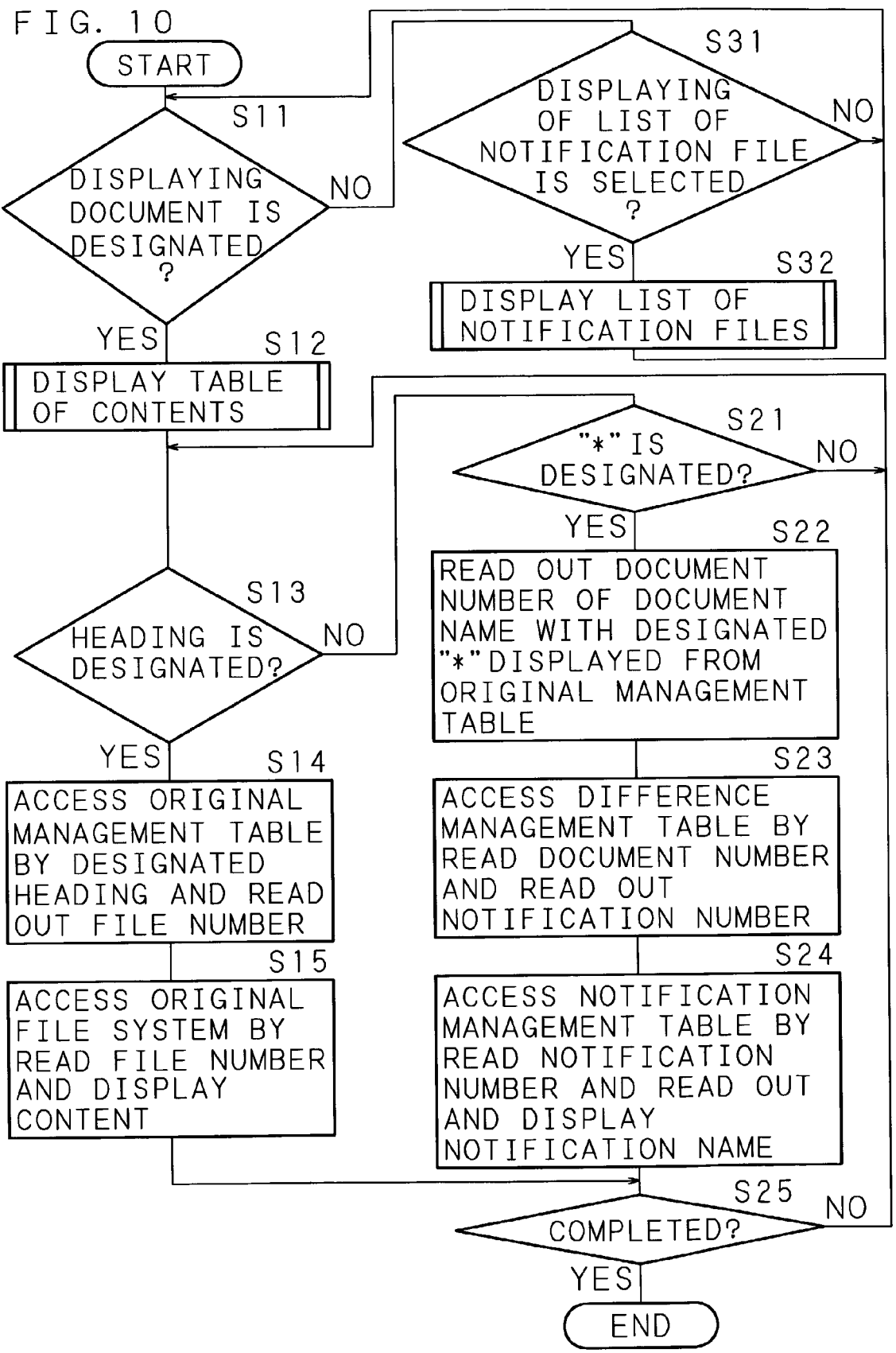
FIG. 10 is a flow chart showing the procedure when the system is operated from any one of the terminal devices of the electronic document system of the present invention.
Figure 11:
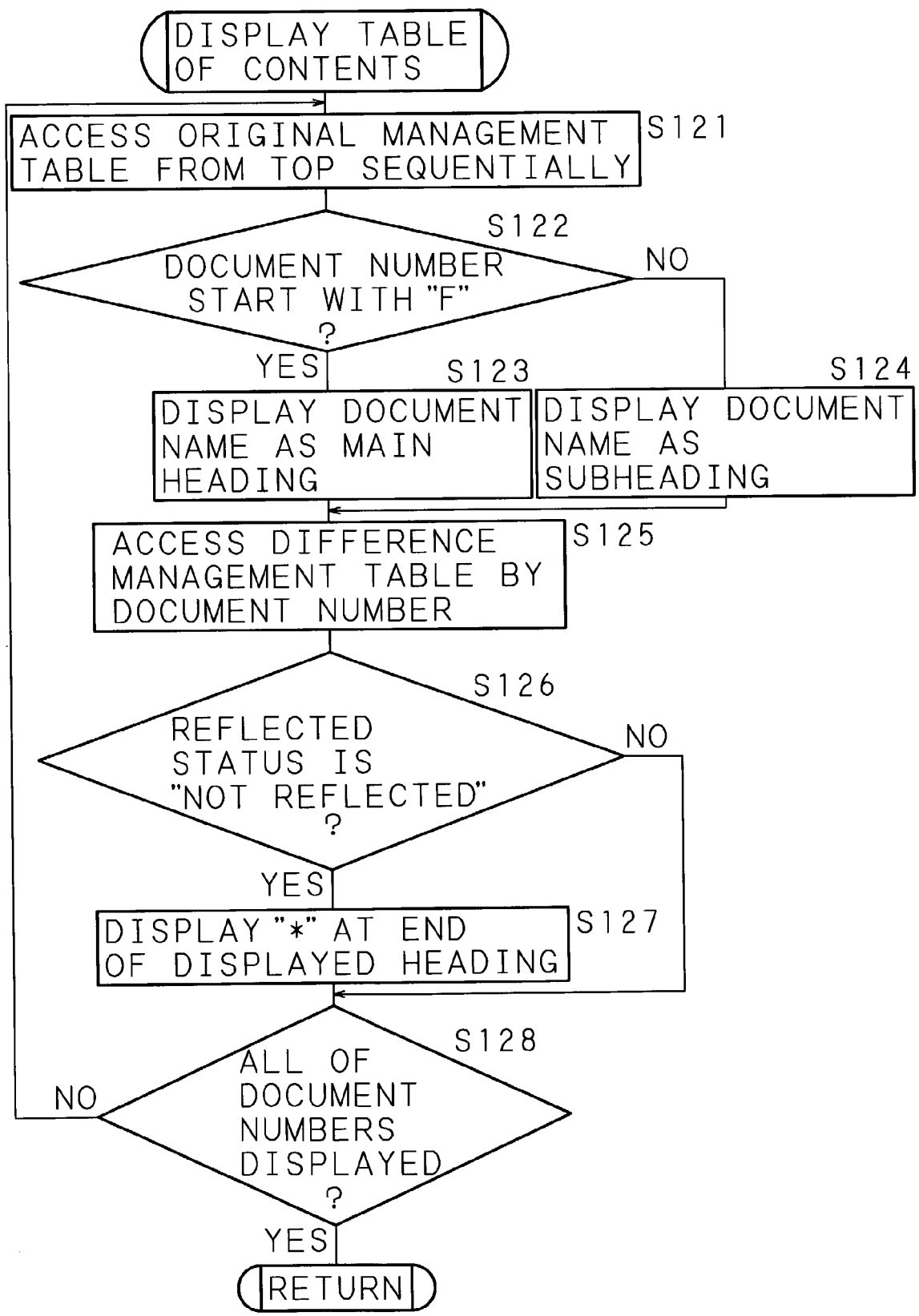
FIG. 11 is a flow chart showing the procedure when the system is operated from any one of the terminal devices of the electronic document system of the present invention.

Moreover, it is possible to refer to the original files and notification files registered in the file system 2 by using a WEB browser through a plurality of terminal devices 32, 33 . . . , 42, 43 . . . which can be directly or indirectly connected to the management apparatus 1. The operation of the electronic document system of the present invention when referring to the original files and notification files from such a terminal device will be explained with reference to FIG. 9A, FIG. 9B and FIG. 9C that are schematic views of the displayed screen of a display XD of the operated terminal device when the system is operated from any one of the terminal devices, and the flow charts of FIG. 10 and FIG. 11 showing the procedure.

When an instruction to display a document is given to a terminal device (YES in step S11), the instruction is sent to the management apparatus 1, and then the CPU 11 first performs the process of displaying the table of contents (step S12). This process of displaying the table of contents is prepared as a subroutine shown in FIG. 11.

When the process of displaying the table of contents is started, the CPU 11 accesses the original management table 23 from the top sequentially (step S121). When the document number starts with "F" (YES in step S122), the CPU 11 displays the document name as a main heading on the display XD of the terminal device (step S123). When the document number does not start with "F", i.e., starts with "D" (NO in step S122), the CPU 11 displays the document name as a subheading on the display XD of the terminal device (step S124).

Next, the CPU 11 accesses the difference management table 25 by the document number (step S125). If the reflected status is "not reflected" (YES in step S126), the CPU 11 displays a predetermined mark, for example, "*", at the end of the displayed heading (document name) (step S127). The CPU 11 repeats the above-described processes until the completion of the processes for all of the document numbers registered in the original management table 23 (step S128). However, not all of the document numbers registered in the original management table 23 are displayed on the display XD of the terminal device.

When the process of displaying the table of contents as described above has been carried out, the table of contents of the original document as shown in FIG. 9A is displayed on the display XD of the terminal device. In this example, "*" is displayed at the ends of the subheadings "First Chapter—General Rules" and "Second Chapter—Procedure" following the main heading "Purchase Procedure". This means that the status ("reflected or "not reflected") of each document name (heading), which is registered as the reflected status in the difference management table 25, has been reflected.

When the table of contents is displayed as described above, the CPU 11 judges whether a heading is designated or "*" is designated on the display XD of the terminal device (steps S13, S21). When either of the headings is designated (YES in step S13), the CPU 11 accesses the original management table 23 by the designated heading (document name) and reads out the file number (step S14). Next, the CPU 11 accesses the original file system 21 by the read file number so as to read out the content of the corresponding original file, and displays it on the display XD of the terminal device (step S15).

Thus, the content of the heading in the table of contents, selected by the user of the terminal device, is displayed on the display XD. However, if "*" is displayed at the end of the heading selected by the user, since "*" means the presence of a notification file for the heading, the user can designate "*" displayed on the display XD (YES in step S21). When "*" is designated, the CPU 11 reads out the document number of the document name with the designated "*" displayed at the end thereof, from the original management table 23 (step S22), and accesses the difference management table 25 by the read document number so as to read out the notification number (step S23). Next, the CPU 11 accesses the notification management table 24 by the read notification number so as to read out the notification name, and displays the notification name on the display XD of the terminal device (step S24).

Consequently, as shown in FIG. 9B, the relevant notification file is displayed on the display XD. In this case, although only the notification file which has not been reflected in the original document is displayed, since the notification file which has not been reflected in the original document is just displayed, it causes no practical problem for the user.

To more specifically explain the above-described processes, in the table of contents of the original document displayed on the display XD of the terminal device as shown in FIG. 9A, "*" is displayed at the end of the subheading "Second Chapter—Procedure" under the main heading "Purchase Procedure", and therefore, if the user clicks this "*" by input means such as a mouse, the document number "D002" of "Second Chapter—Procedure" is read out from the original management table 23, the status indicating that the notification number "T002" has not been reflected is read out from the difference management table 25, according to the document number "D002", and the notification name "Change in Purchase Rules (April)" is read out from the notification management table 24, according to the notification number "T002", and displayed on the display XD of the terminal device as shown in FIG. 9B.

Furthermore, when the user clicks the portion of "Change in Purchase Rule (April)" on the screen of the display XD shown in FIG. 9B with the mouse, the content thereof is read out from the notification file system 22 and displayed on the display XD of the terminal device as shown in FIG. 9C.

Figure 12:
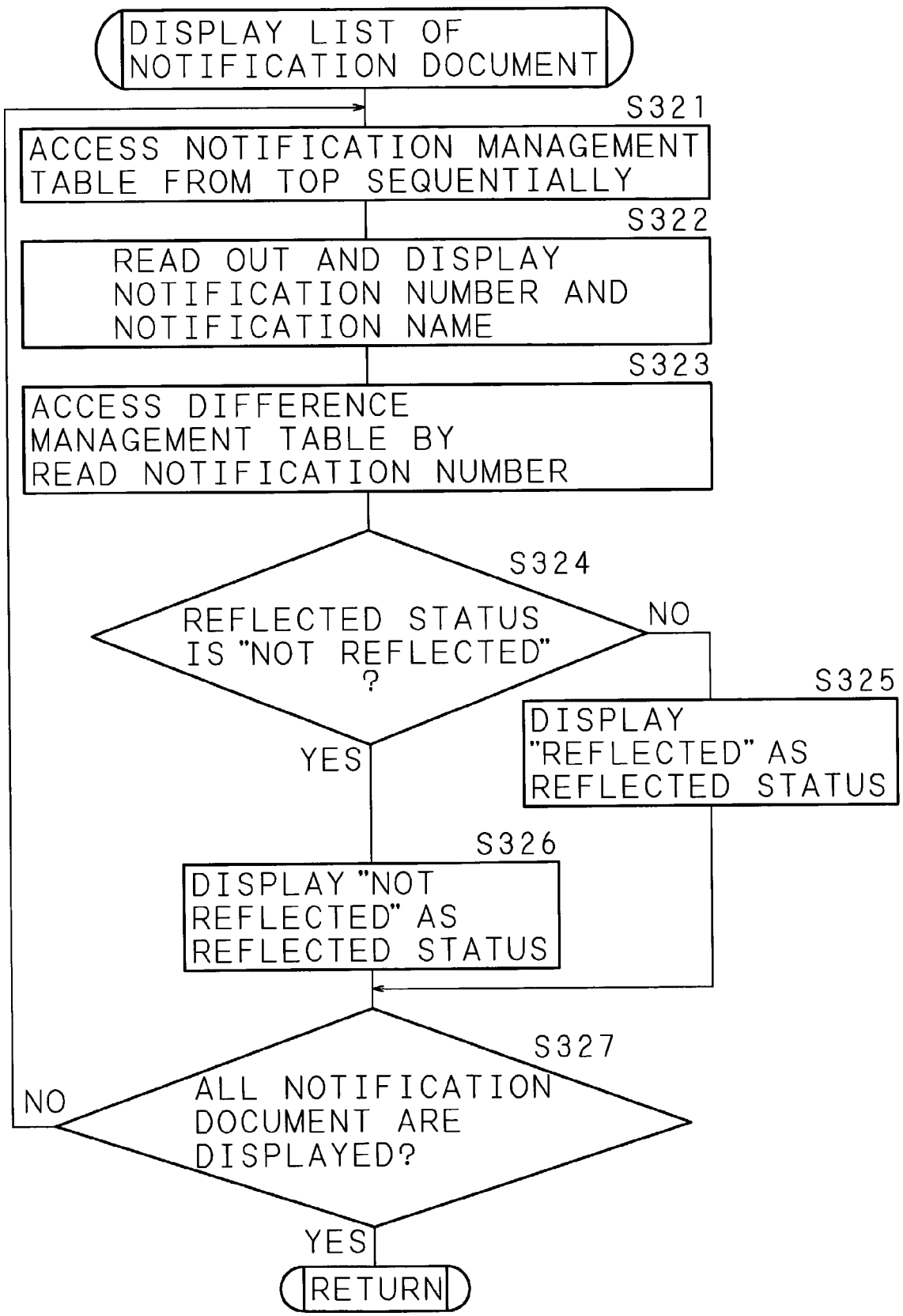
FIG. 12 is a flow chart showing the procedure of displaying a notification document list of the electronic document system of the present invention.

Next, in the flow chart of FIG. 10, when displaying of the notification file is selected (YES in step S31), the CPU 11 performs the process of displaying a list of notification files (step S32). This process of displaying a list of notification files is prepared as a subroutine shown in FIG. 12. Moreover, FIG. 13 is a schematic view showing the relationship between the displayed screen of the display 1D and relevant tables when registering a notification document in the management apparatus 1.

First, the CPU 11 accesses the notification management tables 24 from the top sequentially (step S321), and reads out the first notification number and notification name and displays them on the display XD of the terminal device (step S322). Next, the CPU 11 accesses the difference management table 25 by the read notification number (step S323). If the reflected status is "not reflected" (YES in step S324), the CPU 11 displays "not reflected" in the column "reflected status of original" on the display XD of the terminal device so as to correspond to the notification name displayed previously (step S326). If the reflected status is "reflected" (NO in step S324), the CPU 11 displays "reflected" in the column "reflected status of original" on the display XD of the terminal device so as to correspond to the notification name displayed previously (step S325).

Figure 13:
FIG. 13 is a schematic view showing the relationship between the displayed screen of the display and relevant tables when registering a notification document in the management apparatus of the electronic document system of the present invention.

When the CPU 11 performs the above-described process repeatedly for all the data registered in the notification management table 24 (step S327), a notification document list screen as shown in FIG. 13 is displayed on the display XD of the terminal device. Note that, by designating the displayed portion of any one of the notification document names with the mouse or the like on this notification document list screen, the content of the notification document is displayed on the display XD. In this example, since the notification name "Change in Purchase Rules (April)" of the notification number "T002" was designated, the content "The payment method will be changed." is displayed.

FIG. 14 and FIG. 15 are schematic views showing the content of a computer program recorded on a memory product according to the present invention.

As shown in FIG. 14, a computer program product of the present invention comprises: the process (P1) of causing a computer to access the original file system 21 storing original files created by dividing an original document into a plurality of units and converting them into electronic form, the notification file system 22 storing notification files created by converting a notification document notifying that a change was made to the original document into electronic form, the original management table 23 storing the document numbers specifying the original files stored in the original file system 21 and the document names of the respective original files in connection with each other, and the difference management table 25 storing a document number specifying an original file corresponding to a changed portion of the original and a notification number specifying the corresponding notification file to correspond with each other; the process (P2) of causing the computer to accept an instruction to display the document names of the original files stored in the original file system 21 on the display; the process (P3) of causing the computer to read out the document names of the original files from the original management table 23 and display the document names on the display according to the accepted instruction; the process (P4) of causing the computer to search whether or not the document numbers specifying the document names of the original files displayed on the display are stored in the difference management table 25; and the process (P5) of causing the computer to control the display to display a predetermined indication "*" indicating the presence of a notification file, if it is found that the document numbers being searched for are stored in the difference management table 25.

Moreover, as shown in FIG. 15, a computer program product of the present invention comprises; the process (P11) of causing the computer to access the notification management table 24 storing notification numbers specifying the notification files stored in the notification file system 22 and the notification names of the respective notification files in connection with each other; the process (P12) of causing the computer to accept designation of a predetermined indication "*"; the process (P13) of causing the computer to read out the notification number specifying the notification file corresponding to the accepted designated predetermined indication "*", from the difference management table 25; and the process (P14) of causing the computer to read out the name of the notification file specified by the read notification number, from the notification management table 24, and display it on the display.

Further, a computer program product of the present invention comprises; the process (P21) of causing the computer to display the document names of the document files stored in the original management table 23; the process (P22) of causing the computer to accept designation of the document name of an original file displayed on the display; the process (P23) of causing the computer to read out the document number specifying the original file corresponding to the accepted designated document name, from the original management table 23; and the process (P24) of causing the computer to read out the original file corresponding to the read document number, from the original file system 21, and display the original file on the display.

In the above-described embodiments, the original file system 21, notification file system 22, original management table 23, notification management table 24, difference management table 25, etc. are stored together in the file system 2 of the management apparatus 1 so that they are managed directly by the management apparatus 1. Needless to say, the present invention can be constructed as a system in which the respective file systems, tables, etc. are arranged in a dispersed state on a network.

As described above, according to the electronic document system and electronic document management apparatus of the present invention, in the case where an electronic document original (original file) and an electronic notification document (notification file) indicating a change in the content of the original are both present, when an original file is displayed on the display of the terminal device, it is possible to accurately recognize whether or not a notification file has already been issued for this portion. On the other hand, when a notification file is displayed on the display of the terminal device, it is possible to accurately recognize whether or not the notification file has already been reflected in the original file. It is therefore possible to prevent mistakes in the work and misjudgments in the maintenance and operation of machinery and equipment, and avoid considerable economical loss in the business activities and serious accidents in the maintenance and operation of machinery and equipment.

Additionally, according to a computer program product and a memory product of the present invention, it is possible to realize the above-mentioned electronic document system and electronic document management device of the present invention by a general-purpose computer.

As this invention may be implemented in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electronic document system, comprising:
    an original file system for storing unit original electronic information created by dividing an original electronic document having a table of contents with headings into a plurality of units and converting the plurality of units into electronic information corresponding to each heading in the table of contents of the original electronic document;
    a notification file system for storing notification electronic information created by converting a notification document, which notifies that a change was made to the original electronic document, into electronic information;
    an original management table for storing information specifying the unit original electronic information stored in said original file system and information suggesting a content of each unit original electronic information in connection with each other;
    a difference management table for storing information specifying unit original electronic information corresponding to a portion of the original electronic document to which the change was made and information specifying the corresponding notification electronic information to correspond with each other;
    a display unit for displaying information; and
    a management apparatus includes a processor performing operations of:
        displaying on said display unit the information suggesting the content of unit original electronic information stored in said original management table;
        searching whether or not information specifying the unit original electronic information corresponding to the information displayed on said display unit is stored in said difference management table; and
        displaying a predetermined indication, which indicates presence of notification electronic information, on said display unit wherein the predetermined indication is added to the information suggesting the content of unit original electronic information displayed on said display unit when in said searching operation the information being searched for is stored in said difference management table.

2. The electronic document system as set forth in claim 1, wherein said processor of said management apparatus further performing operations of:
    displaying on said display unit the information suggesting the content of the unit original electronic information stored in said original management table;
    when the information suggesting the content of the unit original electronic information displayed on said display unit is designated, reading out from said original management table the information specifying the unit original electronic information corresponding to the designated information;
    reading out from said original file system the unit original electronic information corresponding to the read information read out from said original management table; and
    displaying said information read out from said original file system on said display unit.

3. The electronic document system as set forth in claim 1, further comprising a notification management table for storing information specifying the notification electronic information stored in said notification file system and information suggesting a content of each notification electronic information in connection with each other,
    wherein said processor of said management apparatus further performing operations of:
        when said predetermined indication displayed on said display unit is designated, reading out from said difference management table the information specifying the notification electronic information corresponding to the designated predetermined indication;
        reading out from said notification management table the information suggesting the content of the notification electronic information specified by the read information read out from said difference management table; and
        displaying said information read out from said notification management table on said display unit.

4. The electronic document system as set forth in claim 3, wherein said processor of said management apparatus further performing operations of:
    displaying on said display unit the information suggesting the content of the unit original electronic information stored in said original management table;
    when the information suggesting the content of the unit original electronic information displayed on said display unit is designated, reading out from said original management table the information specifying the unit original electronic information corresponding to the designated information;
    reading out from said original file system the unit original electronic information corresponding to the read information read out from said original management table; and
    displaying said information read out from said original file system on said display unit.

5. An electronic document management apparatus comprising a processor performing operations of:
    accessing an original file system for storing unit original electronic information created by dividing an original electronic document having a table of contents with headings into a plurality of units and converting the plurality of units into electronic information corresponding to each heading in the table of contents of the original electronic document; a notification file system for storing notification electronic information created by converting a notification document, which notifies a change was made to the original electronic document, into electronic information; an original management table for storing information specifying the unit original electronic information stored in said original file system and information suggesting a content of each unit original electronic information in connection with each other; and a difference management table for storing information specifying unit original electronic information corresponding to a portion of the original electronic document to which the change was made and information specifying the corresponding notification electronic information to correspond with each other;
    accepting an instruction to display on a display unit the information suggesting the content of the unit original electronic information stored in said original management table;
    reading out the information suggesting the content of the unit original electronic information from said original management table and displaying the read information on said display unit according to the accepted instruction;
    searching whether or not information specifying the unit original electronic information corresponding to the information displayed on said display unit is stored in said difference management table; and
    displaying a predetermined indication, which indicates presence of notification electronic information, on said display wherein the predetermined indication is added to the information suggesting the content of unit original electronic information displayed on said display unit when in said searching operation the information being searched for is stored in said difference management table.

6. The electronic document management apparatus as set forth in claim 5, wherein said processor further performing operations of:
    displaying the information suggesting the content of the unit original electronic information stored in said original management table on said display unit; and
    when the information suggesting the content of the unit original electronic information displayed on said display unit is designated, reading out from said original management table the information specifying the unit original electronic information corresponding to the designated information;
    reading out from said original file system the unit original electronic information corresponding to the read information read out from said original management table; and
    displaying said information read out from said original file system on said display unit.

7. The electronic document management apparatus as set forth in claim 5, wherein said processor further performing operations of:
    accessing a notification management table for storing information specifying the notification electronic information stored in said notification file system and information suggesting a content of each notification electronic information in connection with each other;
    when said predetermined indication displayed on said display unit is designated, reading out from said difference management table the information specifying the notification electronic information corresponding to the designated predetermined indication;
    reading out from said notification management table the information suggesting the content of the notification electronic information specified by the read information read out from said difference management table; and
    displaying said information read out from said notification management table on said display unit.

8. The electronic document management apparatus as set forth in claim 7, wherein said processor further performing operations of:
    displaying the information suggesting the content of the unit original electronic information stored in said original management table on said display unit;
    when the information suggesting the content of the unit original electronic information displayed on said display unit is designated, reading out from said original management table the information specifying the unit original electronic information corresponding to the designated information;

reading out from said original file system the unit original electronic information corresponding to the read information read out from said original management table; and displaying said information read out from said original file system on said display unit.

9. An electronic document system, comprising:

original file storing means for storing unit original electronic information created by dividing an original electronic document having a table of contents with headings into a plurality of units and converting the plurality of units into electronic information corresponding to each heading in the table of contents of the original electronic document;

notification file storing means for storing notification electronic information created by converting a notification document, which notifies a change was made to the original electronic document, into electronic information;

original management table storing means for storing information specifying the unit original electronic information stored in said original file storing means and information suggesting a content of each unit original electronic information in connection with each other;

difference management table storing means for storing information specifying unit original electronic information corresponding to a portion of the original electronic document to which the change was made and information specifying the corresponding notification electronic information to correspond with each other;

displaying means for displaying the information suggesting the content of unit original electronic information stored in said original management table storing means;

searching means for searching whether or not information specifying the unit original electronic information corresponding to the information displayed on said displaying means is stored in said difference management table storing means; and controlling means for displaying a predetermined indication, which indicates presence of notification electronic information, on said displaying means wherein the predetermined indication is added to the information suggesting the content of unit original electronic information displayed on said display unit when said searching means finds the information being searched for is stored in said difference management table storing means.

10. The electronic document system as set forth in claim 9, wherein said displaying means displays the information suggesting the content of the unit original electronic information stored in said original management table storing means, and said controlling means, when the information suggesting the content of the unit original electronic information displayed on said displaying means is designated, reads out from said original management table storing means the information specifying the unit original electronic information corresponding to the designated information, reads out from said original file storing means the unit original electronic information corresponding to the read information read out from said original management table storing means, and displays said information read out from said original file storing means on said displaying means.

11. The electronic document system as set forth in claim 9, further including notification management table storing means for storing information specifying the notification electronic information stored in said notification file storing means and information suggesting a content of each notification electronic information in connection with each other, wherein said controlling means, when said predetermined indication displayed on said displaying means is designated, reads out from said difference management table storing means the information specifying the notification electronic information corresponding to the designated predetermined indication, reads out from said notification management table storing means the information suggesting the content of the notification electronic information specified by the information read out from said difference management table storing means, and displays said information read out from said notification management table storing means on said displaying means.

12. The electronic document system as set forth in claim 11, wherein said displaying means displays the information suggesting the content of the unit original electronic information stored in said original management table storing means, and said controlling means, when the information suggesting the content of the unit original electronic information displayed on said displaying means is designated, reads out from said original management table storing means the information specifying the unit original electronic information corresponding to the designated information, reads out from said original file storing means the unit original electronic information corresponding to the read information read out from said original management table storing means, and displays said information read out from said original file storing means on said displaying means.

13. An electronic document management apparatus, comprising:

accessing means for accessing original file storing means for storing unit original electronic information created by dividing an original electronic document having a table of contents with headings into a plurality of units and converting the plurality of units into electronic information corresponding to each heading in the table of contents of the original electronic document, notification file storing means for storing notification electronic information created by converting a notification document, which notifies a change was made to the original electronic document, into electronic information, original management table storing means for storing information specifying the unit original electronic information stored in said original file storing means and information suggesting a content of each unit original electronic information in connection with each other, and difference management table storing means for storing information specifying unit original electronic information corresponding to a portion of the original electronic document to which the change was made and information specifying the corresponding notification electronic information to correspond with each other;

means for accepting an instruction to display on displaying means the information suggesting the content of the unit original electronic information stored in said original management table storing means;

means for reading out the information suggesting the content of the unit original electronic information from said original management table storing means and displaying the read information on said displaying means according to the accepted instruction;

searching means for searching whether or not information specifying the unit original electronic information corresponding to the information displayed on said displaying means is stored in said difference management table storing means; and controlling means for displaying a predetermined indication, which indicates presence of notification electronic information, on said displaying means wherein the predetermined indication is added to the information suggesting the content of unit original electronic information displayed on said display unit when said searching means finds the information being searched for is stored in said difference management table storing means.

14. The electronic document management apparatus as set forth in claim 13, wherein said controlling means displays the information suggesting the content of the unit original electronic information stored in said original management table storing means on said displaying means, and when the information suggesting the content of the unit original electronic information displayed on said displaying means is designated, said controlling means reads out from said original management table storing means the information specifying the unit original electronic information corresponding to the designated information, reads out from said original file storing means the unit original electronic information corresponding to the read information read out from said original management table storing means, and displays said information read out from said original file storing means on said displaying means.

15. The electronic document management apparatus as set forth in claim 13, wherein said accessing means further accesses notification management table storing means for storing information specifying the notification electronic information stored in said notification file storing means and information suggesting a content of each notification electronic information in connection with each other, and said controlling means, when said predetermined indication displayed on said displaying means is designated, reads out from said difference management table storing means the information specifying the notification electronic information corresponding to the designated predetermined indication, reads out from said notification management table storing means the information suggesting the content of the notification electronic information specified by the read information read out from said difference management table storing means, and displays said information read out from said notification management table storing means on said displaying means.

16. The electronic document management apparatus as set forth in claim 15, wherein said controlling means displays the information suggesting the content of the unit original electronic information stored in said original management table storing means on said displaying means, and when the information suggesting the content of the unit original electronic information displayed on said displaying means is designated, said controlling means reads out from said original management table storing means the information specifying the unit original electronic information corresponding to the designated information, reads out from said original file storing means the unit original electronic information corresponding to the read information read out from said original management table storing means, and displays said information read out from said original file storing means on said displaying means.

17. A computer program product for use with an electronic document system, comprising:

a computer usable storage medium having a computer readable program code embodied therein for managing an electronic document system, said computer readable program code comprising:

causing a computer to access an original file system for storing unit original electronic information created by dividing an original electronic document having a table of contents with headings into a plurality of units and converting the plurality of units into electronic information corresponding to each heading in the table of contents of the original electronic document; a notification file system for storing notification electronic information created by converting a notification document, which notifies a change was made to the original electronic document, into electronic information; an original management table for storing information specifying the unit original electronic information stored in said original file system and information suggesting a content of each unit original electronic information in connection with each other; and a difference management table for storing information specifying unit original electronic information corresponding to a portion of the original electronic document to which the change was made and information specifying the corresponding notification electronic information to correspond with each other;

causing a computer to accept an instruction to display on a display unit the information suggesting the content of the unit original electronic information stored in said original management table;

causing a computer to read out the information suggesting the content of the unit original electronic information from the original management table and display the read information on said display unit according to the accepted instruction;

causing a computer to search whether or not the information specifying the unit original electronic information corresponding to the information displayed on said display unit is stored in said difference management table; and causing a computer to display a predetermined indication, which indicates presence of notification electronic information, on said display unit wherein the predetermined indication is added to the information suggesting the content of unit original electronic information displayed on said display unit when the information being searched for is stored in said difference management table.

18. The computer program product as set forth in claim 17, wherein said computer readable program code further comprises:

causing a computer to display on said display unit the information suggesting the content of the unit original electronic information stored in said original management table;

causing a computer to accept designation of the information suggesting the content of the unit original electronic information displayed on said display unit;

causing a computer to read out from said original management table the information specifying the unit original electronic information corresponding to the accepted designated information; and causing a computer to read out from said original file system the unit original electronic information corresponding to the read information read out from said original management table, and display said information read out from said original file system on said display unit.

19. The computer program product as set forth in claim 17, wherein said computer readable program code further comprises:

causing a computer to access a notification management table for storing information specifying the notification electronic information stored in said notification file system and information suggesting a content of each notification electronic information in connection with each other;

causing a computer to accept designation of said predetermined indication;

causing a computer to read out from said difference management table the information specifying the notification electronic information corresponding to the accepted designated predetermined indication; and causing a computer to read out from said notification management table information suggesting the content of the notification electronic information specified by the read information read out from said difference management table, and display said information read out from said notification management table on said display unit.

20. The computer program product as set forth in claim 19, wherein said computer readable program code further comprises:

causing a computer to display on said display unit the information suggesting the content of the unit original electronic information stored in said original management table;

causing a computer to accept designation of the information suggesting the content of the unit original electronic information displayed on said display unit;

causing a computer to read out from said original management table the information specifying the unit original electronic information corresponding to the accepted designated information; and causing a computer to read out from said original file system the unit original electronic information corresponding to the read information read out from said original management table, and display said information read out from said original file system on said display unit.

21. A computer memory product readable by a computer to manage an electronic document system, wherein said computer accessing an original file system for storing unit original electronic information created by dividing an original electronic document having a table of contents with headings into a plurality of units and converting the plurality of units into electronic information corresponding to each heading in the table of contents of the original electronic document; a notification file system for storing notification electronic information created by converting a notification document, which notifies a change was made to the original electronic document, into electronic information; an original management table for storing information specifying the unit original electronic information stored in said original file system and information suggesting a content of each unit original electronic information in connection with each other; and a difference management table for storing information specifying unit original electronic information corresponding to a portion of the original electronic document to which the change was made and information specifying the corresponding notification electronic information to correspond with each other; said computer memory product comprising:

an instruction to display on a display unit the information suggesting the content of the unit original electronic information stored in said original management table;

an instruction to read out the information suggesting the content of the unit original electronic information from said original management table and displaying the read information on said display unit according to the accepted instruction;

an instruction to search whether or not the information specifying the unit original electronic information corresponding to the information displayed on said display unit is stored in said difference management table; and an instruction to display a predetermined indication, which indicates presence of notification electronic information, on said display unit wherein the predetermined indication is added to the information suggesting the content of unit original electronic information displayed on said display unit when the information being searched for is stored in said difference management table.

22. The computer memory product as set forth in claim 21, further comprising:

an instruction for displaying on said display unit the information suggesting the content of the unit original electronic information stored in said original management table;

an instruction for accepting designation of the information suggesting the content of the unit original electronic information displayed on said display unit;

an instruction for reading out from said original management table the information specifying the unit original electronic information corresponding to the accepted designated information; and an instruction for reading out from said original file system the unit original electronic information corresponding to the read information read out from said original management table, and displaying said information read out from said original file system on said display unit.

23. The computer memory product as set forth in claim 11, wherein said computer is further accessing a notification management table for storing information specifying the notification electronic information stored in said notification file system and information suggesting a content of each notification electronic information in connection with each other, said computer memory product further comprising:

an instruction for accepting designation of said predetermined indication;

an instruction for reading out from said difference management table the information specifying the notification electronic information corresponding to the accepted designated predetermined indication; and an instruction for reading out from said notification management table information suggesting the content of the notification electronic information specified by the read information read out from said difference management table, and displaying said information read out from said notification management table on said display unit.

24. The computer memory product as set forth in claim 23, further comprising:
an instruction for displaying on said display unit the information suggesting the content of the unit original electronic information stored in said original management table;
an instruction for accepting designation of the information suggesting the content of the unit original electronic information displayed on said display unit;
an instruction for reading out from said original management table the information specifying the unit original electronic information corresponding to the accepted designated information; and
an instruction for reading out from said original file system the unit original electronic information corresponding to the read information read out from said original management table, and displaying said information read out from said original file system on said display unit.

* * * * *

UNITED STATES PATENT AND TRADEMARK OFFICE
CERTIFICATE OF CORRECTION

| | | |
|---|---|---|
| PATENT NO. | : 7,243,114 B2 | Page 1 of 1 |
| APPLICATION NO. | : 10/298901 | |
| DATED | : July 10, 2007 | |
| INVENTOR(S) | : Masashi Akazawa et al. | |

It is certified that error appears in the above-identified patent and that said Letters Patent is hereby corrected as shown below:

Column 16, Line 17 Claim 1, after "notifies" delete "that".

Signed and Sealed this

Twenty-fourth Day of June, 2008

JON W. DUDAS
*Director of the United States Patent and Trademark Office*